United States Patent [19]
Danzy et al.

[11] Patent Number: 5,515,884
[45] Date of Patent: May 14, 1996

[54] MULTI-MEDIA SAFETY RELIEF VALVE

[75] Inventors: Roger D. Danzy; John E. Fain, Jr., both of Pineville, La.

[73] Assignee: Dresser Industries Inc., Dallas, Tex.

[21] Appl. No.: 245,475

[22] Filed: May 18, 1994

[51] Int. Cl.⁶ .................................................. F16K 17/08
[52] U.S. Cl. ........................................ 137/478; 137/476
[58] Field of Search ................................ 137/469, 476, 137/478

[56] References Cited

U.S. PATENT DOCUMENTS

| | | | |
|---|---|---|---|
| 488,020 | 12/1892 | Lohbiller . | |
| 498,803 | 6/1893 | Lunken . | |
| 849,532 | 4/1907 | Coutant . | |
| 1,356,853 | 10/1920 | Clark | 137/478 |
| 1,690,097 | 11/1928 | Ackermann . | |
| 2,787,127 | 4/1957 | Benz | 62/1 |
| 2,875,978 | 3/1959 | Kmiecik | 251/333 |
| 2,917,072 | 12/1959 | Saville | 137/469 |
| 3,131,720 | 6/1964 | Horvath | 137/543 |
| 3,149,643 | 9/1964 | Breitsprecher | 137/469 |
| 3,520,326 | 7/1970 | Bowen | 137/478 X |
| 3,572,372 | 3/1971 | Moore | 137/478 X |
| 3,605,793 | 9/1971 | Kinsel | 137/469 X |
| 4,036,250 | 7/1977 | Dashner | 137/476 |
| 4,130,130 | 12/1978 | Stewart et al. | 137/478 X |
| 5,094,266 | 3/1992 | Ledbetter | 137/469 |

OTHER PUBLICATIONS

Dresser Industries Catalog published in 1991, entitled Safety Relief Valves, Sizing and Selection, Fall, 1991, SRV–1.

*Primary Examiner*—Stephen M. Hepperle
*Attorney, Agent, or Firm*—Jenkens & Gilchrist

[57] ABSTRACT

A safety valve for relieving excessive pressure in a fluid system including a valve body having a central chamber, a discharge flow nozzle connected into the chamber having a valve seat on the end of the flow nozzle in the chamber, a valve disc movably mounted in the chamber for movement between a closed position on the nozzle seat and an open position spaced from the nozzle seat, a valve disc holder connected with the valve disc having a deflecting rim circumscribing the valve disc seat provided with an internal outwardly divergent annular deflecting surface, a blowdown ring mounted on the nozzle having an inner ring portion provided with an outer frustoconical deflecting surface substantially parallel with and spaced from the valve disc holder deflecting surface, the blowdown ring including an outer cylindrical rim provided with circumferentially spaced semi-elliptical discharge ports and an internal cylindrical surface substantially parallel with and spaced from the outer cylindrical surface of the valve disc holder, and a spring connected with the valve disc holder for biasing the valve disc holder and valve disc closed. The blowdown ring is adjustable for changing the blowdown of the valve. The configuration of the valve disc holder and the blowdown ring deflecting surfaces provides chatter free operation.

4 Claims, 3 Drawing Sheets

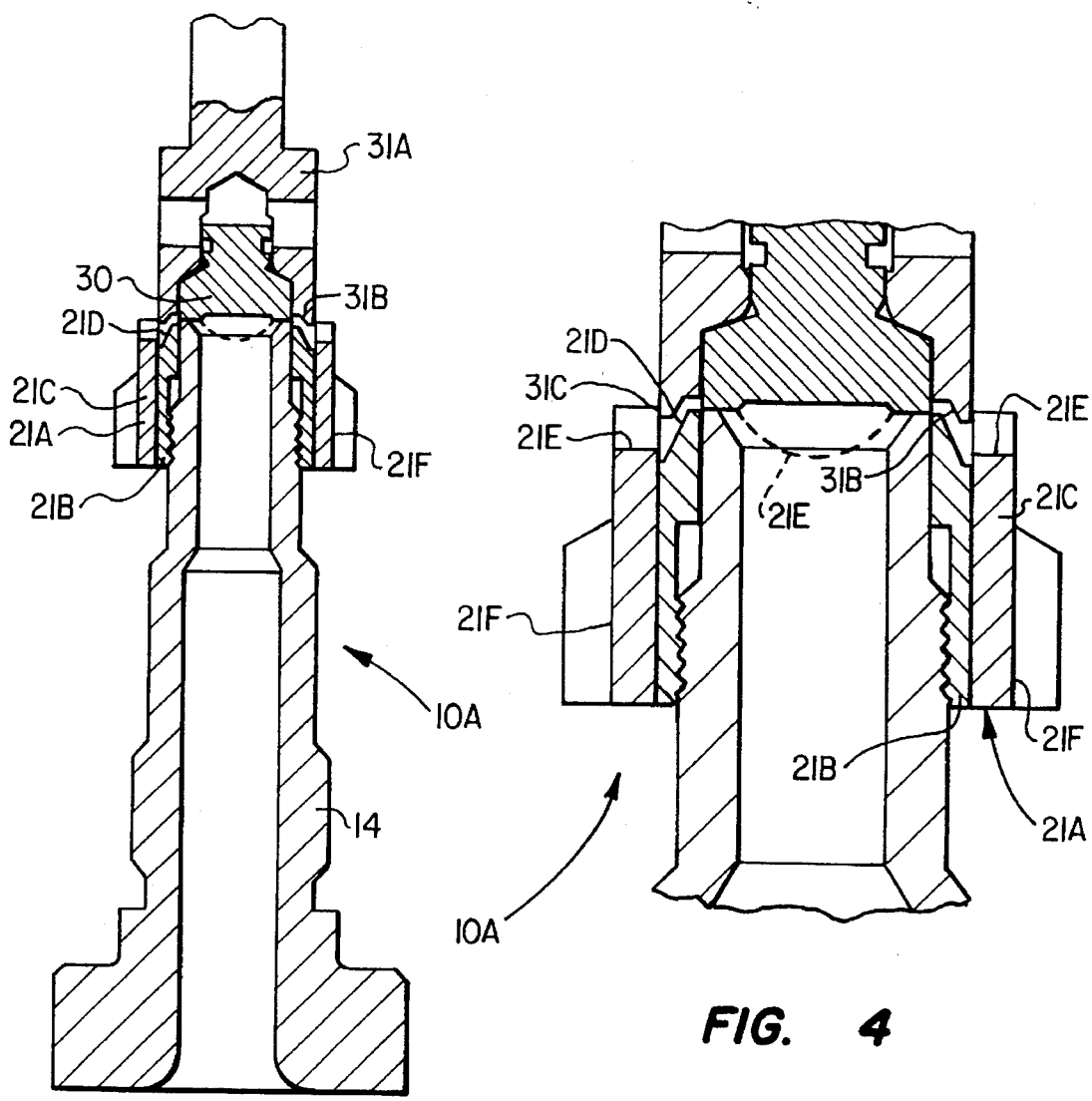
FIG. 2
FIG. 4
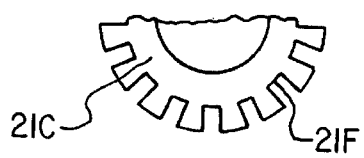
FIG. 3

MULTI-MEDIA SAFETY RELIEF VALVE

BACKGROUND OF THE INVENTION

Field of the Invention

This invention relates to safety valves for relieving excessive pressure in fluid systems to avoid equipment damage and personal injury. More specifically, this invention relates to valve components to improve valve performance in certain contemporary safety valve designs.

Pressure relief or safety valves are employed for overpressure protection in operating systems that utilize fluids in either liquid, vapor, or gaseous states. Typical of such safety valves is a huddling chamber type valve which has been marketed for a number of years. Such valves include a nozzle for admitting fluids into the valve from a pressure vessel. A valve seat is formed on the discharge end of the nozzle in a chamber of the main body of the valve. The nozzle is closed to prevent fluid escape by a valve member generally referred to as a "valve disc" which is movable relative to the nozzle seat and biased to a closed position on the seat by a compression spring. When the fluid pressure in the vessel exceeds a predetermined value, the valve disc is forced from the nozzle seat to admit fluid from the pressure vessel into the valve chamber from which the fluid flows through an outlet leading from the chamber. When the pressure in the vessel drops to a predetermined level the compression spring forces the valve disc back on the nozzle seat closing the safety valve. The difference between the pressure at which the valve opens and the pressure at which the valve recloses is often referred to as "blowdown".

A valve of the general type of the present invention is illustrated and described in the following U.S. Pat. No. 4,036,250 for BLOW-DOWN SAFETY VALVE, issued to James W. Dashner, Jul. 19, 1977. More specifically, valves of the type of the present invention are 1900 SRV's and 1990 SRV's manufactured and marketed by Dresser Industries, Industrial Valve Operation, Dresser Valve and Controls Division, and described and illustrated in a Dresser Industries Catalog published in 1991, entitled Safety Relief Valves, Sizing and Selection, Fall, 1991, SRV-1.

SUMMARY OF THE INVENTION

It is a principal object of the present invention to provide a new and improved safety valve for relieving excessive fluid pressure.

It is still further object of the invention to provide a safety valve including a valve disc holder and adjusting ring which provide improved valve performance.

It is another object of the invention to provide a safety valve configured to reduce or eliminate valve chatter.

It is another object of the invention to provide a safety valve having improved components providing service with blowdown of less than about ten percent (10%).

It is another object of the invention to provide a safety valve which may be used for gas, vapor, and liquid media service.

BRIEF DESCRIPTION OF THE DRAWINGS

FIG. 2 is a fragmentary longitudinal schematic view in section and elevation of a valve disc, a valve disc holder, a blowdown ring, and a nozzle of a safety valve in accordance with the present invention;

FIG. 3 is a fragmentary bottom view of the adjustable blowdown ring illustrated in FIG. 2;

FIG. 4 is an enlarged fragmentary side view in section taken within the broken line 3 shown in FIG. 2, illustrating the valve in a static closed condition;

DETAILED DESCRIPTION OF A PREFERRED EXEMPLARY EMBODIMENT OF THE INVENTION

Figure 1:
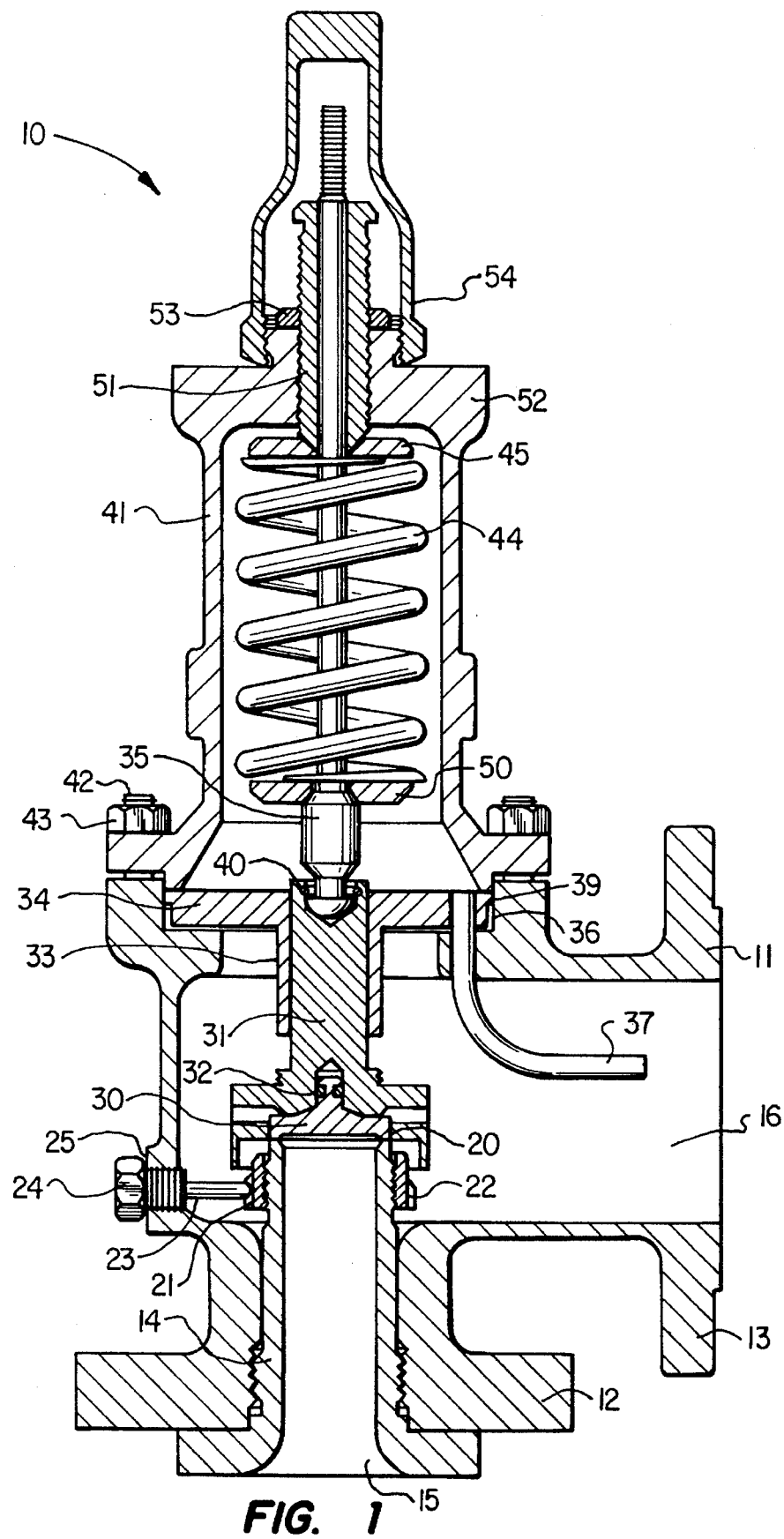
FIG. 1 is a longitudinal side view in section and elevation of a prior safety valve of the type to which the present invention applies.
Figure 5:
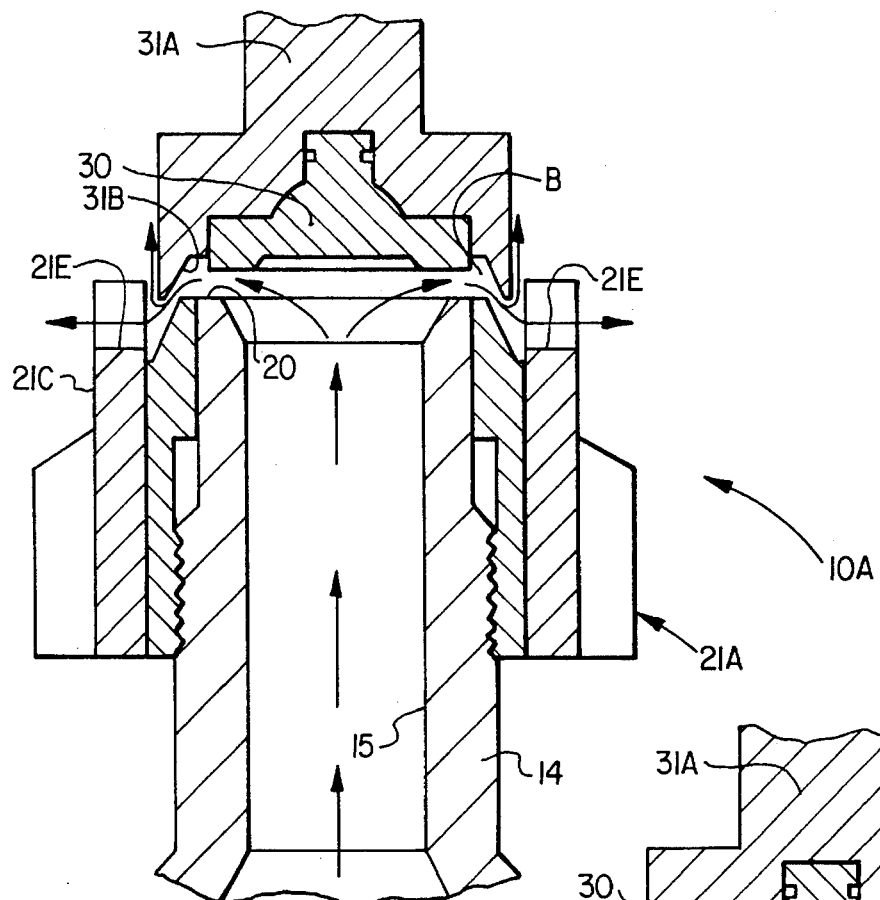
FIG. 5 is a fragmentary side view in section similar to FIG. 4 showing the valve at an initial opening position when valve lifting begins.

Referring to FIG. 1, a typical prior art safety valve 10 to which the present invention applies includes a valve body 11 having flanged inlet and outlet connections 12 and 13. A nozzle 14 provided with an inlet flow passage 15 is installed in the inlet connection 12. The inward end of the nozzle 14 is provided with an annular end surface defining a valve seat 20. An adjustable blowdown ring 21 is threaded on the upper end portion of the nozzle 14. The ring 21 has a plurality of external, longitudinal, locking slots 22 circumscribing the ring engagable by an adjusting ring pin 23 having a control knob 24. A ring seal 25 seals between the valve body and the adjusting ring knob 24 to prevent leakage from the valve body outwardly around the adjusting ring knob. A valve disc 30 is supported from a disc holder 31 for movement relative to the valve seat 20 on the nozzle to open and close the valve. A disc retainer ring 32 around the neck of the valve disc locks the valve disc in the lower end of the disc holder. The lower end face of the valve disc has an annular valve seat which is engagable with and moveable relative to the valve seat 20 on the nozzle for opening and closing the valve. The valve disc holder 31 is slidably mounted in a guide sleeve 33 having a guide flange 34 secured with the valve body 11. The valve disc holder 31 is connected with a spindle 35 by a retaining ring 40. The spindle 35 operates in a bonnet 41 mounted on the valve body base 11 on studs 42 secured by nuts 43. A gasket 39 is mounted between the bonnet 41 and the base 11. Another gasket 36 is mounted between the disc guide flange 34 and the base 11. An eductor tube 37 is connected through the guide flange 34 extending into the valve outlet passage in the flanged outlet 13. A coil spring 44 around the spindle 35 is compressed between an upper spring washer 45 and a lower spring washer 50 which shoulders against the enlarged lower end of the spindle 35. The upper end portion of the spindle 35 is journaled in a tubular adjusting screw or sleeve 51 threadedly engaged through the upper end 52 of the bonnet. An adjusting screw nut 53 is threaded on the adjusting screw 51 against the upper end of the head of the bonnet. A cap 54 is mounted on the bonnet upper end 52 over the upper ends of the spindle 35 and the spindle adjusting screw 51.

In operation, the prior art safety valve 10 is mounted on a pressure vessel, not shown, to relieve excessive fluid pressure which may develop in the pressure vessel. The fluid pressure in the vessel is communicated to the safety valve through the flow passage 15 in the nozzle 14 of the valve. The safety valve is held closed by the compressed spring 44 which urges the valve disc 30 into sealing engagement with the valve seat 20 on the nozzle 14. As the pressure in the vessel approaches to the set pressure of the safety valve, a pressure value is reached below the set pressure at which the valve begins to leak preliminary to fully opening at the set pressure. This pressure level at which the valve begins to leak defines in relation to the opening pressure what is known as "seat tightness". As valve leakage begins, the valve disc 30 is lifted by the fluid pressure from the seat 20 permitting flow from the flow passage 15 around the valve disc within the seat 20 into the outlet 16 of the safety valve. As the fluid pressure in the vessel decreases due to the release of the pressure by the safety valve, the pressure reaches a reseating pressure for the valve at which the valve disc 30 again engages the seat 20 reclosing the valve. The pressure reduction between the set pressure of the valve and the reseating pressure is termed the blowdown differential, or, more briefly stated, the "blowdown" of the valve.

In accordance with the invention, a preferred exemplary embodiment of modified components of the prior art safety valve 10 shown in FIG. 1 is illustrated schematically in FIGS. 2–6. Referring to FIGS. 2–4, the valve disc 30 as illustrated in FIG. 1 is mounted in a modified valve disc holder 31A which coacts with an adjustable blowdown ring 21A formed by an inner ring 21B and an outer ring 21C mounted on the nozzle 14 of the prior art valve 10.

FIG. 4 shows in enlarged detail specific features of a modified blowdown ring 21A and a modified valve disc holder 31A which are substituted for the blowdown ring 21 and the valve disc holder 31 in the prior art valve 10 to provide the safety valve of the present invention. Referring particularly to FIG. 4, the upper end portion of an inner ring 21B of the blowdown ring is provided with an external, annular, upwardly and inwardly sloping tapered deflecting surface 21D. The upper end portion of the outer ring 21C of the blowdown ring has upwardly opening circumferentially spaced semi-elliptical discharge ports 21E. The inner surface of the outer ring 21C and the outer surface of the disc holder are spaced apart cylindrical surfaces defining a cylindrical annulus between the disc holder and outer ring 21C at the valve positions of FIGS. 4 and 5. The outer ring 21C is also provided with circumferentially spaced longitudinal external locking slots 21F, see FIG. 3, which receive the locking pin 23 connected with the pin control knob 24 for locking the blowdown ring at a desired position on the nozzle. The lower end portion of the valve disc holder 31A is provided with an internal annular downwardly and outwardly sloping deflecting surface 31B. The deflecting surface 31B is within an annular downwardly extending skirt 31C on the disc holder 31A. The skirt 31C telescopes over the upper end of the inner ring 21B of the blowdown ring at the closed position of the valve as in FIG. 4. At such position the disc holder deflecting surface 31B and the blowdown ring deflecting surface 21D are spaced apart in substantially parallel relationship defining a downwardly and outwardly flared, annular, conical shaped, discharge space between the deflecting surfaces. Thus, the substitution of the blowdown ring 21A and the disc holder 31A for the corresponding components in the valve 10 of FIG. 1 provides a safety valve 10A including the features of the present invention.

Figure 6:
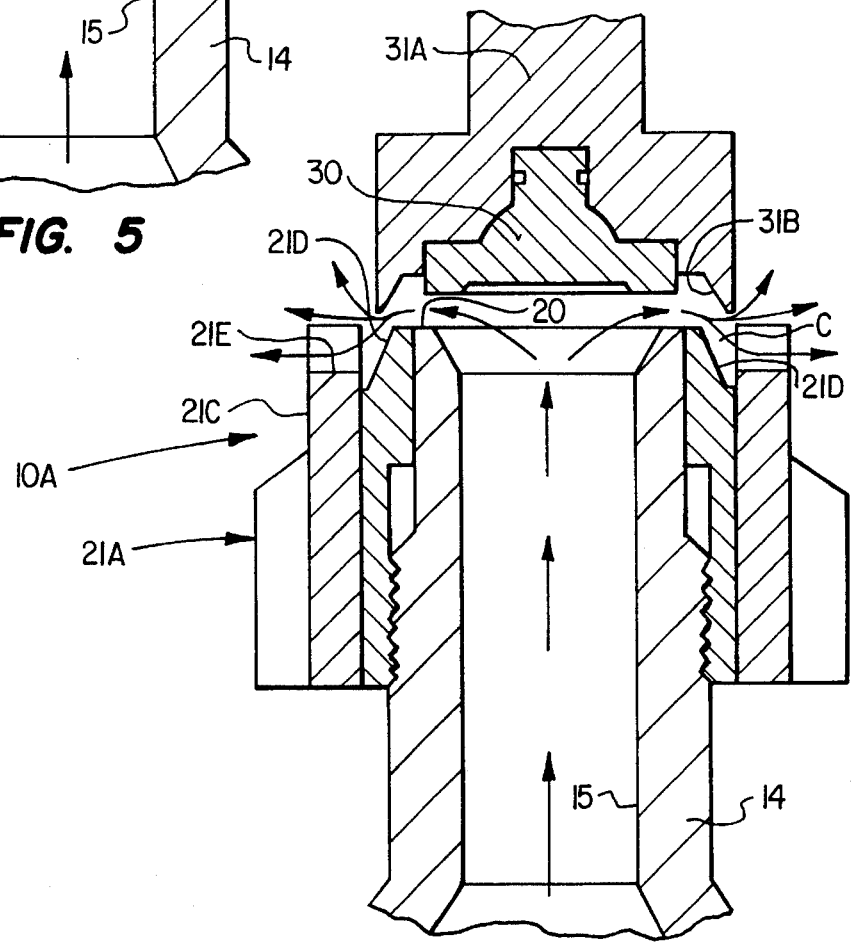
FIG. 6 is a fragmentary side view in section similar to FIGS. 4 and 5 illustrating the valve fully open.

The operation of the safety valve 10A is essentially the same as that described for the prior art valve 10 shown in FIG. 1 with improved performance of the valve 10A due to the features of the present invention. As illustrated in FIGS. 2–4, the valve 10A is closed with the fluid pressure acting over the lower surfaces of the disc 30 in the flow passage 15 of the nozzle 14. This fluid pressure is resisted by the force of the spring 44 urging the disc holder 31A downwardly holding disc 30 on the seat surface 20 of the nozzle. As the pressure in the vessel increases, the upward force on the disc tends to equalize the spring force and the net forces on the valve disc approach zero (0). In vapor or gas service, the valve may "simmer" before it will "pop" fully open. When the vessel pressure increases to within 1–2 percent (1–2%) of the set pressure, the fluid pressure in the vessel forces the disc and disc holder upwardly against the spring with the fluid audibly moving past the seating surfaces on the nozzle seat and disc into the space between the seat surfaces in the chamber portion B between the seat surfaces, see FIG. 5. The secondary annular orifice defined between the tapered surface 31B in the disc holder and the tapered surface 21D on the inner blowdown ring causes a pressure build-up in the chamber area B providing an additional upward force on the disc and disc holder to overcome the spring force and fully open the valve. Adjusting the blowdown ring 21A by rotation of the ring on the nozzle 14 changes the space between the tapered annular surfaces 31B and 21D altering the restriction between the surfaces to control the pressure build-up in the chamber B. The blowdown ring is adjusted by rotating the ring which is threaded on the upper end portion of the nozzle 14. When adjusted to the proper position, the blowdown ring is locked by rotating the knob 24 to insert the inward end of the locking pin 23 into one of the slots 21F of the ring to prevent any further rotation of the ring. The controlled pressure build-up in the chamber B applies sufficient upward force on the disc 30 and the lower end of the disc holder 31A to overcome the spring force, lifting the disc away from the nozzle seat causing the valve to "pop" open. Once the valve has opened, additional pressure build-up occurs in the space C, FIG. 6, which is below the tapered annular surface 31B on the lower end of the disc holder 31A and above the tapered surface 21D on the upper end of the blowdown ring. This additional pressure build-up is due to the sudden flow increase and the restriction to flow through the annular orifice defined between the lower edge of the disc holder and the upper inside edge of the outer blowdown ring 21C. The additional forces produced by the further pressure build-up below the disc and blowdown ring lower end surfaces lifts the disc and disc holder to the fully open position as seen in FIG. 6. The fluid flows radially outwardly between the disc and disc holder and the blowdown ring as represented by the arrows in FIG. 6 flowing through the semi-elliptical ports 21E in the blowdown ring causing the lifting of the disc and disc holder at a gradual rate dependent upon the increase of pressure in the nozzle flow passage. The annular space between the blowdown ring and the disc holder causes the escaping fluid to be discharged parallel to the circumference of the disc holder. This discharging fluid produces a force on the disc holder opposite to the force created by the pressure of the fluid acting upon the disc and disc holder. The escape of the pressure fluid from the pressure vessel lowers the pressure until the pressure on disc drops below the set pressure at which the valve recloses. By definition blowdown is the difference between the pressure at which the valve opens and the pressure at which the valve recloses. Blowdown is caused by the result of the spring force not being able to overcome the total of the forces produced by the fluid pressure over the area defined by the lower face of the disc and disc holder surfaces exposed to the pressure in the areas B and C until the pressure over the lower face of the disc drops below the set pressure.

The design of the disc and blowdown ring including the semi-elliptical ports in the blowdown ring provide a safety relief valve which will operate on gas, vapor, and liquid media to current American Society of Mechanical Engineers Code Standards producing chatter free operation with blowdown less than 10 percent for all pressure medias controlled. It has been found that limiting the flow on the exterior of the disc holder in contrast with prior art valves which limit the flow on the interior of the disc holder provides a partial cancellation of the forces created by the media on the interior area of the disc holder and disc combination.

While a preferred exemplary embodiment of the invention has been described and illustrated in the drawings, it is to be understood that the full scope of the invention is defined by the appended claims.

What is claimed is:

1. A safety valve to relieve fluid pressure in a pressure vessel when the pressure reaches a predetermined maximum value, including:

a flow fitting defining a discharge nozzle for connection into a pressure vessel including a valve seat around a discharge flow passage through the nozzle:

a valve disc having a valve seat thereon movable between a first closed position of engagement with the nozzle valve seat and a second open position spaced from the nozzle valve seat;

an annular disc holder mounted around and supporting the valve disc for movement between the first and second positions, including a circumferential defecting rim spaced radially outward from the valve disc seat and extending endwardly beyond the valve disc seat, the outer face of said deflecting rim being a cylindrical surface and the inner face of said deflecting rim is a tapered surface sloping outwardly from the valve seat of the valve disc; and an adjustable blowdown ring on the discharge nozzle including an annular inner nose portion around the nozzle seat projecting into and spaced inwardly from the disc holder rim at the first closed and bleed positions of the valve disc and a concentric annular outer rim spaced from the inner nose portion and the disc holder deflecting rim defining an annular flow passage between the blowdown ring and the deflecting rim in the closed and bleed positions of the disc holder and disc, the outer face of inner nose portion of the blowdown ring being tapered away from the discharge nozzle seat toward the inner face of the outer rim of the blowdown ring, the disc holder deflecting rim having an annular conical inner surface sloping outwardly toward the discharge nozzle, the blowdown ring having an annular tapered outer surface sloping outwardly away from the valve disc substantially parallel with the sloping inner surface of the deflecting rim of the disc holder, the concentric outer rim of the blowdown ring having a plurality of circumferentially spaced semi-elliptical discharge ports.

2. A safety valve to relieve fluid pressure in a pressure vessel when the pressure reaches a predetermined maximum value, comprising:

a flow fitting defining a discharge nozzle for connection into a pressure vessel, the discharge nozzle having a discharge flow passage therethrough and an end surface in the form of an annular, substantially flat, valve seat around the discharge flow passage;

a valve body connected with the discharge nozzle defining a discharge flow chamber around the discharge end of the discharge nozzle;

a valve disc having a substantially flat annular valve seat mounted in the discharge chamber for movement relative to the valve seat on the discharge nozzle between a closed position and an open position relative to the discharge nozzle valve seat;

a valve disc holder connected with and supporting the valve disc, the valve disc holder having an annular deflecting rim circumscribing the valve disc and provided with a frustoconical annular deflecting inside surface sloping beyond and away from the valve disc seat surface for deflecting fluid flowing from the discharge flow passage of the discharge nozzle outwardly into the discharge chamber between the discharge nozzle valve seat and the valve disc valve seat to deflect the fluid away from the valve disc downwardly and outwardly from the discharge nozzle;

an adjustable blowdown ring moveably mounted on the discharge nozzle around the valve seat on the end of the discharge nozzle, the blowdown ring having an inner ring portion having an outer frustoconical deflecting surface tapering outwardly away from the discharge end of the discharge nozzle substantially parallel with the frusto conical surface on the disc holder deflecting rim, the blowdown ring having an outer annular rim portion circumscribing the inner ring portion, the outer rim portion having an internal cylindrical surface, the frustoconical outer surface on the inner ring portion of the blowdown ring converging to the inner cylindrical surface of the outer rim of the blowdown ring, the inner cylindrical surface of the outer rim of the blowdown ring being spaced outwardly and substantially parallel with the outer cylindrical surface of the valve disc holder defining an annular cylindrical flow passage between the outer surface of the valve disc holder and the inner surface of the outer rim of the blowdown ring when the valve disc and holder are at an open simmer position relative to the discharge nozzle and blowdown ring, the outer rim of the blowdown ring having circumferentially spaced endwardly opening semi-elliptical discharge ports opening into the blowdown ring into the space between the inner cylindrical surface of the blowdown ring and the outer frusto conical deflecting surface of the inner ring portion of the blowdown ring; and means connected with the valve disc holder for biasing the valve disc and valve disc holder toward the discharge nozzle to close the valve when the fluid pressure between the discharge nozzle and blowdown ring and the valve disc and valve disc holder is reduced below a predetermined level.

3. A safety valve in accordance with claim 2 wherein an annular space is defined between the blowdown ring and the valve disc holder when the valve is open causing fluid flow discharge parallel to the circumference of the valve disc holder producing a force on the valve disc holder opposite to the force created by the fluid pressure on the valve disc and valve disc holder.

4. A safety valve in accordance with claim 3 where the blowdown ring and the valve disc and valve disc holder are sized and shaped to provide chatter free operation with a blowdown of less than 10 percent for all fluids flowing through the valve.

* * * * *